J. STODDARD.
COMBINED HEADLIGHT AND SIGNAL.
APPLICATION FILED AUG. 11, 1913.

1,084,763.

Patented Jan. 20, 1914.

WITNESSES
A. E. Carlsen.
E. C. Carlsen.

INVENTOR:
Justen Stoddard.
BY his ATTORNEY:
A. M. Carlsen.

UNITED STATES PATENT OFFICE.

JUSTEN STODDARD, OF STILLWATER, MINNESOTA.

COMBINED HEADLIGHT AND SIGNAL.

1,084,763.   Specification of Letters Patent.   Patented Jan. 20, 1914.

Application filed August 11, 1913.  Serial No. 784,275.

*To all whom it may concern:*

Be it known that I, JUSTEN STODDARD, a citizen of the United States, residing at Stillwater, in the county of Washington and State of Minnesota, have invented a new and useful Combined Headlight and Signal, of which the following is a specification.

My invention relates to improvements in signals and headlights for locomotives, and the object is to provide a combined headlight and signal device, which is carried by the locomotive and so arranged that the engineer may from the cab of the engine change the color of the headlight from white to red or green and thereby give signals for purposes hereafter to be explained.

Figure 1:
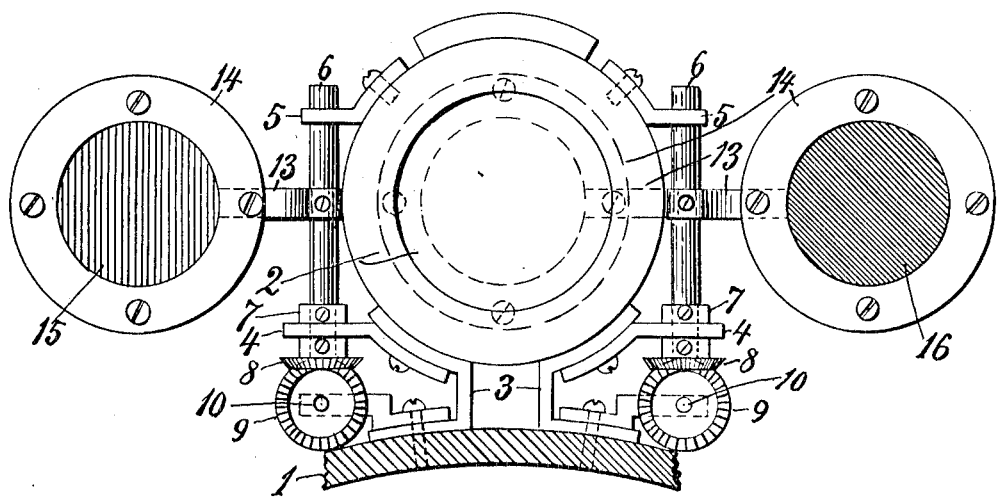
Figure 2:
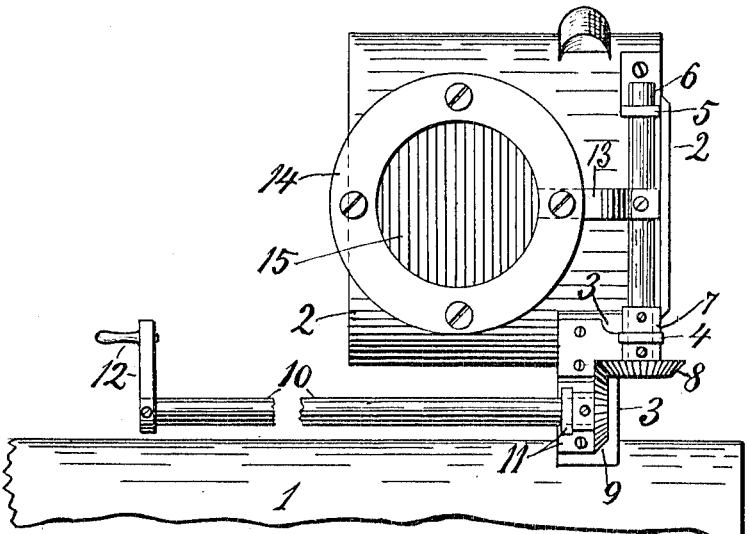

In the accompanying drawing Figure 1 is a front elevation of a headlight mounted on a portion of a locomotive and provided with my signal device. Fig. 2 is a side elevation of the head-light shown in Fig. 1, with the frame holding the red glass folded into idle position at the side of the headlight.

Referring to the drawing by reference numerals, 1 designates a fraction of the boiler or any other suitable part of the locomotive, on which the headlight 2 is mounted by means of brackets 3. To said brackets 3 and to the sides of the headlight are secured brackets 4 and 5. In the latter brackets are journaled at each side of the headlight a vertical shaft 6, which is supported by a collar 7 on one of the brackets in which it is journaled. Fixed on the lower end of each shaft 6 is a miter-gear 8 meshing with a miter-gear 9; the latter gear is fixed on a horizontal shaft 10, which is journaled in a bracket 11 and other bearings (not shown) and provided with a crank 12 located in the cab of the engine (not shown). On each shaft 6 is fixed an arm 13, which carries a frame 14, in one of which is inserted a red glass 15 and in the other a green glass 16.

In the operation of the device, if the engine is running on the main track the white headlight of the locomotive is displayed while the frames 14 are held closed to the sides of the headlight so as not to cause resistance in the air. If the train for any reason is standing still on the main track the engineer operates the crank controlling the frame having the red glass and by closing the same over the front of the headlight the latter will appear red and thus warn other trains that the main track is occupied by a train not in motion. If the train is standing still on a side track the red glass remains idle and the green glass is swung in front of the headlight, as shown in dotted line in Fig. 1, so as to signal that a train is standing still on the side track and the main track is clear. In this way the same one headlight and the two colored glasses, 15, 16, will enable the engineer to signal all trains coming in the opposite direction of his train the position of his train and whether it is in motion or not, and my device does not only prevent accidents by collisions, but it also saves much time and fuel which is usually spent by slacking up or stopping trains while investigating the condition and position of trains sighted in the dark and then starting up again. The device also saves the inconvenience and the help necessary to operate stationary signals for the purposes described.

What I claim is:—

The combination with a locomotive and a headlight mounted thereon and adapted to display normally a white light, of a red glass and a green glass mounted to swing either one of them in front of the white light, and means operable by the engineer at his regular place on the engine, whereby he may swing either glass in front of the light, and away therefrom into idle position at the side of the headlight; said operating means comprising for each glass a frame holding the glass, a vertical shaft fixed to the frame and journaled near the front edge of the headlight, a beveled gear fixed on said shaft, a second beveled gear meshing therewith, a shaft extending from the second gear to the cabin of the engine, and means fixed on said shaft for taking hold of and rotating the shaft.

In testimony whereof I affix my signature, in presence of two witnesses.

JUSTEN STODDARD.

Witnesses:
 J. S. MONTGOMERY,
 R. B. McPHETRES.